United States Patent [19]
Christensen et al.

[11] Patent Number: 5,636,527
[45] Date of Patent: Jun. 10, 1997

[54] ENHANCED FLUID-LIQUID CONTACT

[75] Inventors: Richard N. Christensen, Columbus; Stephen E. Petty, Dublin, both of Ohio

[73] Assignee: The Ohio State University Research Foundation, Columbus, Ohio

[21] Appl. No.: 558,173

[22] Filed: Nov. 15, 1995

[51] Int. Cl.$^6$ ............................................. F25B 15/00
[52] U.S. Cl. ................................................. 62/476; 165/170
[58] Field of Search .......................... 62/101, 476, 484, 62/494, 497; 165/166, 170, DIG. 162, DIG. 163, DIG. 168, DIG. 169, DIG. 172

[56] References Cited

U.S. PATENT DOCUMENTS

| | | | |
|---|---|---|---|
| 2,456,455 | 12/1948 | Simpson | 165/166 |
| 2,877,000 | 3/1959 | Person | 165/166 |
| 3,548,932 | 12/1970 | Menkus | 165/165 |
| 3,782,134 | 1/1974 | Meess et al. | 62/476 |
| 4,470,453 | 9/1984 | Laughlin et al. | 165/165 |
| 4,624,305 | 11/1986 | Rojey | 165/165 |
| 4,893,669 | 1/1990 | Kashiwada et al. | 165/170 X |
| 5,086,837 | 2/1992 | Hagemeister | 165/170 |
| 5,325,684 | 7/1994 | Stierlin et al. | 62/487 |
| 5,499,516 | 3/1996 | Andersson et al. | 62/494 |

FOREIGN PATENT DOCUMENTS

| 469752 | 3/1952 | Italy | 165/170 |
|---|---|---|---|

*Primary Examiner*—William Doerrler
*Attorney, Agent, or Firm*—Philip M. Dunson; Philip J. Pollick

[57] ABSTRACT

Apparatus for mass transfer of gas and liquid flowing through passages therein has a vertical enclosure formed in a pair of sheet metal plates sealed together around their periphery and formed to have rows of horizontal passages communicating with columns of vertical passages in and adjacent to a vertical plane defined by flat contiguous areas of the plates between and around the passages. The inner surfaces of the passages have highly wettable areas to substantially maximize transfer of mass and heat. Each horizontal passage is continuous between the vertical passages with which it communicates. In the main portion of the apparatus, the axis of each vertical passage between one horizontal passage and the next lower one passes through the middle of a flat contiguous area between that next lower horizontal passage and the following still lower one and midway between the axes of the two vertical passages on each side of that flat area, so that fluid in the vertical passages divides approximately equally in its vertical flow between each horizontal passage and the next. Vertical passages connecting alternate ends of successive horizontal passages may be added, to provide also a serpentine path for fluid therein. Openings are provided to receive and expel, respectively, fluids that are to be, or have been, absorbed or desorbed. A plurality of the apparatuses may be placed in another enclosure for transfer of heat between them and a fluid flowing through the enclosure or for mass transfer with such fluid.

21 Claims, 4 Drawing Sheets

ENHANCED FLUID-LIQUID CONTACT

FIELD

This invention relates to apparatus for contacting fluid and liquid. It is especially useful for improved mass transfer of gas and liquid flowing through passages therein. The invention has to do primarily with apparatus for mass and heat transfer that typically is connected to serve as an absorber, or a desorber, or each selectively, in a heat transfer system such as a heat pump, a refrigeration system, or a heating system.

Apparatus according to the invention can also be so connected in a heat transfer system as to function, either always or selectively, as at least part of a condenser or an evaporator.

BACKGROUND

In heat pumps and other systems for transferring mass and heat from one phase and/or region to another it can be advantageous to minimize size and costs, and increase versatility, of various components in the systems. The present invention provides such desirable properties and their concomitant advantages, especially when connected to operate as absorbers and as desorbers.

DISCLOSURE

Typical apparatus according to the invention for fluid-liquid contact of fluid and liquid flowing through passages therein comprises an enclosure formed in a pair of vertically positioned sheet metal plates sealed together around their periphery and formed to have rows of horizontal passages communicating with columns of vertical passages in and adjacent to a vertical plane defined by the plates and by flat contiguous areas of the plates between and around the passages; the inner surfaces of the passages comprising highly wettable areas to substantially maximize transfer of mass and heat; each horizontal passage being continuous between the vertical passages with which it communicates; in the main portion of the apparatus, the axis of each vertical passage between one horizontal passage and the next lower one passing through the middle of a flat contiguous area between that next lower horizontal passage and the following still lower one, and midway between the axes of the two vertical passages on each side of that flat area; so that fluid in the vertical passages divides approximately equally in its vertical flow between each horizontal passage and the next.

A first opening is provided in the upper or lower portion of the apparatus for communication of a first fluid between the enclosure and another entity; the first fluid communicating within the enclosure horizontally via the horizontal passages, and vertically via the vertical passages, as diverted between successive vertical levels by the flat areas therebetween, with lower or higher horizontal passages.

A second opening is provided in the portion of the apparatus opposite from the first opening for communication of a second fluid between the enclosure and another entity; the second fluid communicating within the enclosure horizontally via the horizontal passages, and vertically via the vertical passages, as diverted between successive vertical levels by the flat areas therebetween, with lower or higher horizontal passages.

A third opening is provided, typically in a portion of the apparatus at or near the second opening, for communication of a third fluid between the enclosure and another entity; the third fluid communicating within the enclosure horizontally via the horizontal passages, and optionally vertically via the vertical passages, as diverted between successive vertical levels by the flat areas therebetween, with lower or higher horizontal passages.

In the highest row, the vertical passages are arranged with a flat contiguous area between each one and the next. In the next to highest row, the vertical passages and the flat areas are similarly arranged, and are staggered relative to the highest row, with each passage located directly below a flat area in the highest row and with each flat area located directly below a passage in the highest row. In the next lower row, the vertical passages and the flat contiguous areas are similarly arranged and similarly staggered relative to the next to highest row, and thus are similar to the highest row in arrangement and horizontal positions; and so on, with successively lower rows of passages and flat areas alternately and similarly arranged and staggered.

In typical apparatus the highly wettable areas of the inner surfaces of the passages comprise regions of the surfaces that have been treated by oxidation, deposition of a rough or porous layer, scratching, etching, embossing, or the like, to increase their roughness and their area of contact with the fluid therein.

Typically a plurality of apparatuses are arranged in substantially vertical and parallel planes in a surrounding enclosure for receiving fluid under pressure and at a temperature different from the temperatures in the apparatuses, through an inlet opening in the surrounding enclosure, to flow through the enclosure between and around the apparatuses and exit from an outlet opening in the enclosure; and thereby to transfer heat between the apparatuses and the fluid.

In typical embodiments of the apparatus, the sheet metal plates are formed additionally to have a predominantly vertical end passage communicating between an end of the highest horizontal passage and the near end of the next lower one, a predominantly vertical end passage communicating between the opposite end of said next lower horizontal passage and the near end of the next still lower one, and so on similarly to provide a serpentine path for at least one of the fluids therein including a similar predominantly vertical end passage communicating between near ends of the next to lowest horizontal passage and the lowest one.

DRAWINGS

In some embodiments of the invention the apparatus is positioned as in FIGS. 1, 4, 5, and 6 turned upside down.

CARRYING OUT THE INVENTION

Figure 1:
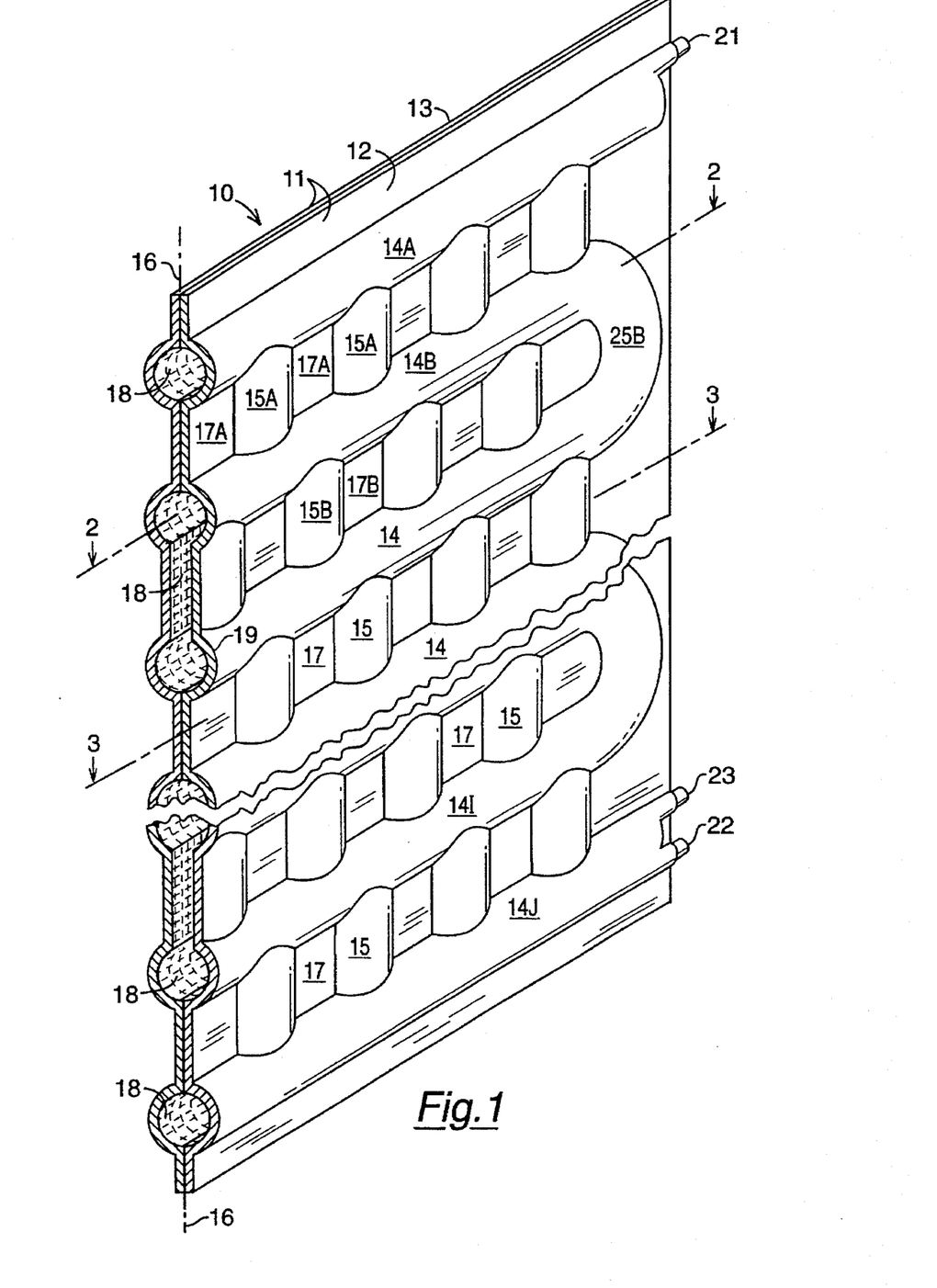
FIG. 1 is a perspective view of typical apparatus for mass transfer of fluid flowing therein according to the present invention, in its normal vertical position, cut in a vertical plane to show part of its interior, and omitting a middle portion between the horizontally broken edges, to permit enlargement of the portions shown.
Figure 2:
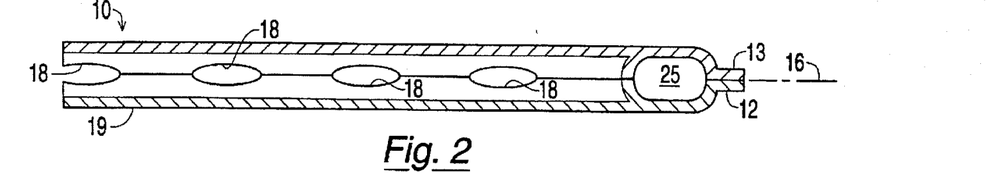
FIG. 2 is a sectional view looking downward from the horizontal plane at the level 2—2 in FIG. 1.
Figure 3:
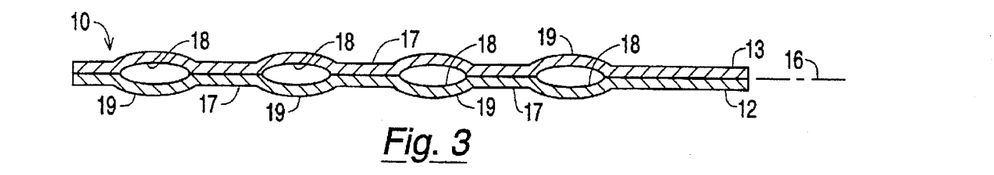
FIG. 3 is a sectional view taken on the horizontal plane at the level 3—3 in FIG. 1.
Figure 4:
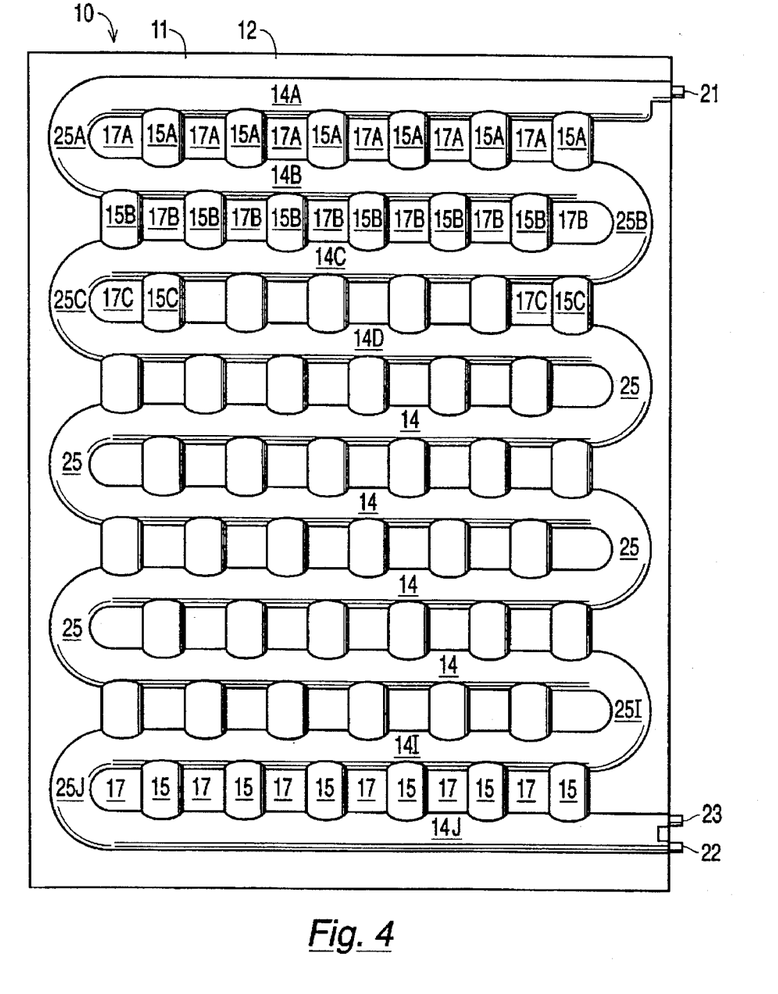
FIG. 4 is a front view of typical apparatus as in FIG. 1.

Referring now to FIGS. 1 and 4, typical apparatus 10 according to the present invention for mass transfer of gas and liquid through passages in the apparatus, comprises an enclosure 11 formed in a pair of substantially vertically positioned highly heat conductive plates 12, 13 sealed together at least substantially around their periphery and formed to have rows of vertically spaced apart substantially horizontal passages 14—14 communicating with columns of horizontally spaced apart substantially vertical passages 15—15 in and adjacent to the substantially vertical plane 16 defined by the plates 12, 13 and by substantially flat contiguous areas 17—17 therein between and around the passages 14—14,15—15;

the inner surfaces 18 of the passages 14—14, 15—15 comprising highly wettable areas to substantially maximize transfer of mass and heat;

each substantially horizontal passage 14 being substantially continuous between the substantially vertical passages 15—15 with which it communicates;

in the portion of the apparatus spaced sufficiently from its periphery that such arrangement is attainable, the axis of each substantially vertical passage 15 between one substantially horizontal passage 14 and the next lower substantially horizontal passage 14 being substantially coincident with a vertical line substantially in the middle of a substantially flat contiguous area 17 between said next lower substantially horizontal passage 14 and the following still lower horizontal passage 14, and substantially coincident with a vertical line substantially midway between the axes of the two substantially vertical passages 15,15 on each side of said substantially flat contiguous area 17;

in such manner that fluid in the substantially vertical passages 15—15 divides approximately equally in its vertical flow between each substantially horizontal passage 14 and the next;

a first opening 21 in the upper or lower portion of the apparatus for communication of a first fluid between the enclosure 11 and another entity; said first fluid communicating within the enclosure 11 horizontally via the substantially horizontal passages 14—14, and vertically via the substantially vertical passages 15—15, as diverted between successive levels in the substantially vertical passages 15—15 by the substantially flat contiguous areas 17—17 therebetween, with lower or higher substantially horizontal passages 14—14;

a second opening 22 in the opposite portion of the apparatus from the portion the first opening is in, for communication of a second fluid between the enclosure 11 and another entity; said second fluid communicating within the enclosure 11 horizontally via the substantially horizontal passages 14—14, and vertically via the substantially vertical passages 15—15, as diverted between successive levels in the substantially vertical passages 15—15 by the substantially flat contiguous areas 17—17 therebetween, with lower or higher substantially horizontal passages 14—14;

a third opening 23, typically in a portion of the apparatus at or near the second opening 22, for communication of a third fluid between the enclosure 11 and another entity; said third fluid communicating within the enclosure 11 horizontally via the substantially horizontal passages 14—14, and optionally vertically via the substantially vertical passages 15—15, as diverted between successive levels in the substantially vertical passages 15—15 by the substantially flat contiguous areas 17—17 therebetween, with lower or higher substantially horizontal passages 14—14.

The highly heat conductive plates 12,13 typically comprise sheet metal plates or plates comprising conductive ceramic or polymeric material.

Typically the passages 14—14,15—15 guide the fluids to flow at least predominantly either in generally opposite directions therein or, alternatively, in generally similar directions therein.

In typical apparatus, the highest row 15A—15A of substantially vertical passages 15—15 comprises a plurality of spaced apart substantially vertical passages 15—15 arranged with a said substantially flat contiguous area 17A between each said passage 15A and the next said passage 15A, the next to highest row 15B—15B of substantially vertical passages 15—15 comprises a similar plurality of passages 15—15 and substantially flat contiguous areas 17B—17B, similarly arranged, and staggered relative to the highest row, with each passage 15B located substantially directly below a substantially flat contiguous area 17A in the highest row and with each substantially flat contiguous area 17B located substantially directly below a passage 15A in the highest row, the next lower row 15C—15C of substantially vertical passages 15—15 comprises a similar plurality of passages 15—15 and substantially flat contiguous areas 17C—17C, similarly arranged and similarly staggered relative to the next to highest row 15B—15B,17B—17B, and thus similar to the highest row 15A—15A,17A—17A in arrangement and horizontal positions, and so on, with successively lower rows of passages and substantially flat contiguous areas alternately and similarly arranged and staggered.

The highly wettable areas of the inner surfaces 18 of the passages 14—14, 15—15 typically comprise regions of the surfaces 18 that have been treated by oxidation, deposition of a rough or porous layer, scratching, etching, embossing, or the like, to increase their roughness and their area of contact with the fluid therein. In some apparatus the outer surfaces 19 of the passages 14—14,15—15 and the other outer surfaces of the enclosure 11 may also comprise highly wettable areas that have been substantially equivalently treated to substantially maximize transfer of mass and heat.

In typical embodiments of the invention, as illustrated in FIG. 4, the highly heat conductive plates 12,13 are formed additionally to have a predominantly vertical end passage 25A communicating between an end of the highest substantially horizontal passage 14A and the near end of the next lower substantially horizontal passage 14B, a predominantly vertical end passage 25B communicating between the opposite end of said next lower substantially horizontal passage 14B and the near end of the next still lower substantially horizontal passage 14C, a predominantly vertical end passage 25C communicating between the opposite end of said still lower substantially horizontal passage 14C and the near end of the next yet lower substantially horizontal passage 14D, and so on similarly to provide a serpentine path for at least one of the fluids therein including a predominantly vertical end passage 25I communicating between near ends of the next to lowest substantially horizontal passage 14I and the lowest substantially horizontal passage 14J.

In typical apparatus 10 for absorption of gas by a liquid flowing in generally opposite directions through the passages in the apparatus, the first opening 21 is located in the highest substantially horizontal passage 14A and communicates with an entity that supplies a weak solution into the enclosure 11, to flow horizontally in said passage 14A and to flow downward therefrom via the substantially vertical passages 15A, 15B, etc., as diverted between successive levels in the substantially vertical passages 15 by the substantially flat contiguous areas 17A, 17B, etc. therebetween, into the lowest substantially horizontal passage 14J;

the third opening 23 is located in a substantially horizontal passage 14 in the lower part of the apparatus and communicates with an entity that supplies a gas into the enclosure to flow horizontally in said passage 14 and to flow predominantly upward therefrom via the substantially vertical passages 15, as diverted between successive levels in the substantially vertical passages 15 by the substantially flat contiguous areas 17 therebetween, for absorption into the solution, to increase the concentration of gas in the solution; and the second opening 22 is located in the lowest substantially horizontal passage 14J and communicates with an entity that receives from the enclosure the stronger solution that is provided therein by the absorption of the gas into the solution.

In typical apparatus 10 as in FIG. 4 including predominantly vertical end passages 25, for absorption of gas by a liquid flowing in generally opposite directions through the passages in the apparatus, the first opening 21 is located in the highest substantially horizontal passage 14A and communicates with an entity that supplies a weak solution into the enclosure 11, to flow horizontally in said passage 14A and to flow downward therefrom via the substantially vertical passages 15, as diverted between successive levels in the substantially vertical passages 15 by the substantially flat contiguous areas 17 therebetween, and via the predominantly vertical end passages 25 communicating between the near ends of successive substantially horizonal passages 14, into the lowest substantially horizontal passage 14J;

the third opening 23 is located in a substantially horizontal passage 14 in the lower part of the apparatus and communicates with an entity that supplies a gas into the enclosure to flow horizontally in said passage 14 and to flow predominantly upward therefrom via the predominantly vertical end passages 25 communicating between the near ends of successive substantially horizontal passages 14, for absorption into the solution, to increase the concentration of gas in the solution; and the second opening 22 is located in the lowest substantially horizontal passage 14J and communicates with an entity that receives from the enclosure the stronger solution that is provided therein by the absorption of the gas into the solution.

Referring now to FIGS. 1 and 4 turned upside down, in typical apparatus 10 for desorption of gas from a liquid flowing through the passages in the apparatus, the second opening 22 is located in the highest substantially horizontal passage 14A and communicates with an entity that supplies a strong solution into the enclosure 11, to flow horizontally in said passage 14A and to flow downward therefrom via the substantially vertical passages 15, as diverted between successive levels in the substantially vertical passages 15 by the substantially flat contiguous areas 17 therebetween, into the lowest substantially horizontal passage 14J;

the third opening 23 is located in the upper part of the apparatus and communicates with an entity that receives from the enclosure 11 gas that has been desorbed from the solution; and the first opening 21 is located in the lowest substantially horizontal passage 14J and communicates with an entity that receives from the enclosure 11 the weaker solution that is provided therein by the desorption of gas from the solution.

In typical apparatus 10 as in FIGS. 1 and 4 turned upside down, including predominantly vertical end passages 25, for desorption of gas from a liquid flowing through the passages in the apparatus, the second opening 22 is located in the highest substantially horizontal passage 14A and communicates with an entity that supplies a strong solution into the enclosure 11, to flow horizontally in said passage 14A and to flow downward therefrom predominantly via the substantially vertical passages 15, as diverted between successive levels in the substantially vertical passages 15 by the substantially flat contiguous areas 17 therebetween, and via the predominantly vertical end passages 25 communicating between the near ends of successive substantially horizontal passages 14, into the lowest substantially horizontal passage 14J;

the third opening 23 is located in the upper part of the apparatus and communicates with an entity that receives from the enclosure 11 gas that has been desorbed from the solution predominantly in the substantially horizontal passages 14 and in the predominantly vertical end passages 25 communicating between the near ends of the successive substantially horizontal passages 14; and the first opening 21 is located in the lowest substantially horizontal passage 14J and communicates with an entity that receives from the enclosure 11 the weaker solution that is provided therein by the desorption of gas from the solution.

In a heat transfer system for heating, cooling, or each selectively: apparatus 10 typically may be so connected in the system as to serve, either always or selectively, as at least part of a condenser, an absorber, a generator, an evaporator, or a recuperator.

Figure 5:
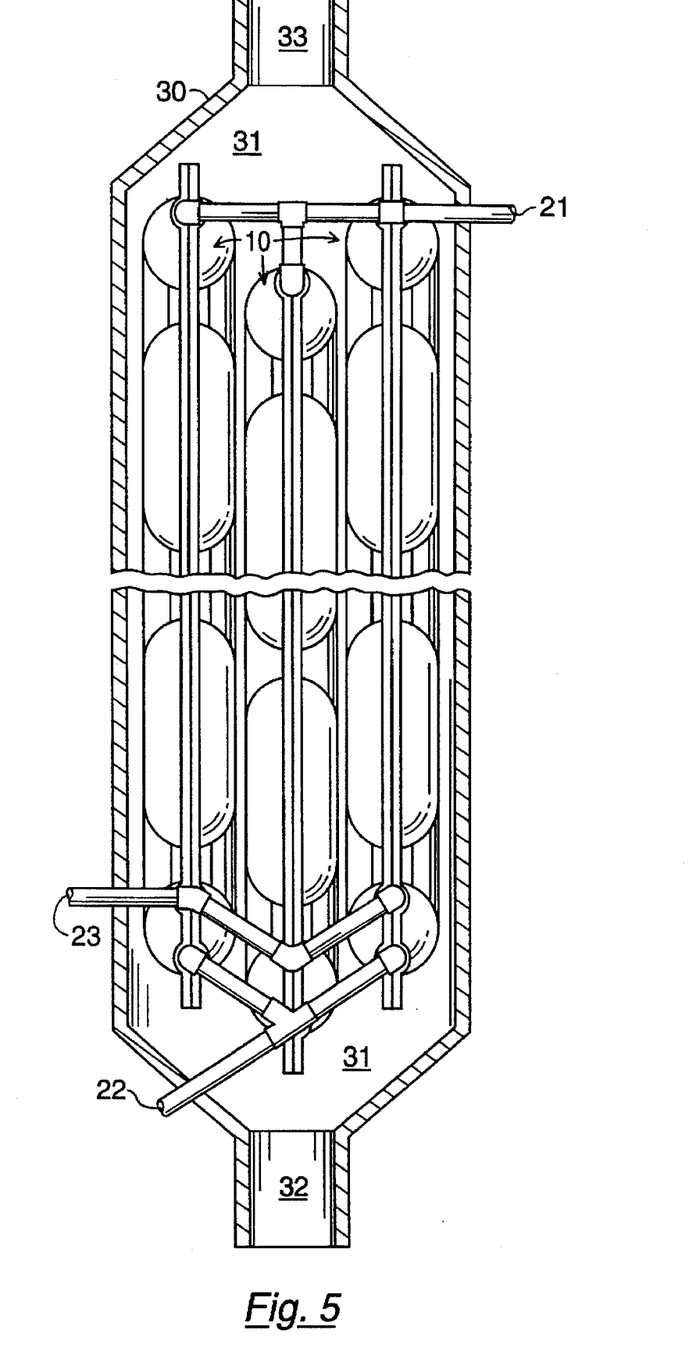
FIG. 5 is a side view of a plurality of apparatuses as in FIGS. 1–4, in an enclosure (shown in vertical section) for transfer of heat between the apparatuses and a fluid in the enclosure.

As illustrated in FIG. 5, a plurality of apparatuses 10 may be arranged in substantially vertical and parallel planes spaced apart in a surrounding enclosure 30 for receiving fluid 31 under pressure and at a temperature different from the temperatures in said apparatuses 10, through an inlet opening 32 or 33 in the surrounding enclosure 30, to flow through the enclosure 30 between and around said apparatuses 10 and exit from an outlet opening 33 or 32 in the enclosure 30; and thereby to transfer heat between said apparatuses 10 and the fluid 31.

Where the apparatuses 10 comprise absorbers, a plurality of them typically are arranged in substantially vertical and parallel planes spaced apart in a surrounding enclosure 30 for receiving a fluid coolant 31 under pressure and at a temperature below the temperatures in said apparatuses 10, through a lower inlet opening 32 in the surrounding enclosure 30, to rise through the enclosure 30 and exit from an upper outlet opening 33 therein; thereby to transfer heat away from said apparatuses 10 and into the coolant 31. Where they comprise desorbers, a plurality of them typically are arranged in substantially vertical and parallel planes spaced apart in a surrounding enclosure 30 for receiving a fluid heating medium 31 under pressure and at a temperature above the temperatures in said apparatuses 10, through an upper inlet opening 33 in the surrounding enclosure 30, to descend through the enclosure 30 and exit from a lower outlet opening 32 therein; thereby to transfer heat into said apparatuses 10 and away from the fluid heating medium 31.

The outer surfaces of the apparatuses 10 in FIG. 5 may comprise highly wettable areas that have been treated by oxidation, deposition of a rough or porous layer, scratching, etching, embossing, or the like, to increase their roughness and their area of contact with the fluid 31 flowing between the inlet and outlet openings 32,33. The combination of apparatuses 10 and the surrounding enclosure 30 may then provide transfer of mass as well as of heat with the fluid 33. Where the apparatuses 10 are operated internally as absorbers or condensers, they can be operated externally on their outer surfaces and in the space between their outer surfaces and the surrounding enclosure 30 as desorbers or evaporators. Where the apparatuses 10 are operated internally as desorbers or evaporators, they can be operated externally on their outer surfaces and in the space between their outer surfaces and the surrounding enclosure 30 as absorbers and condensers.

Figure 6:
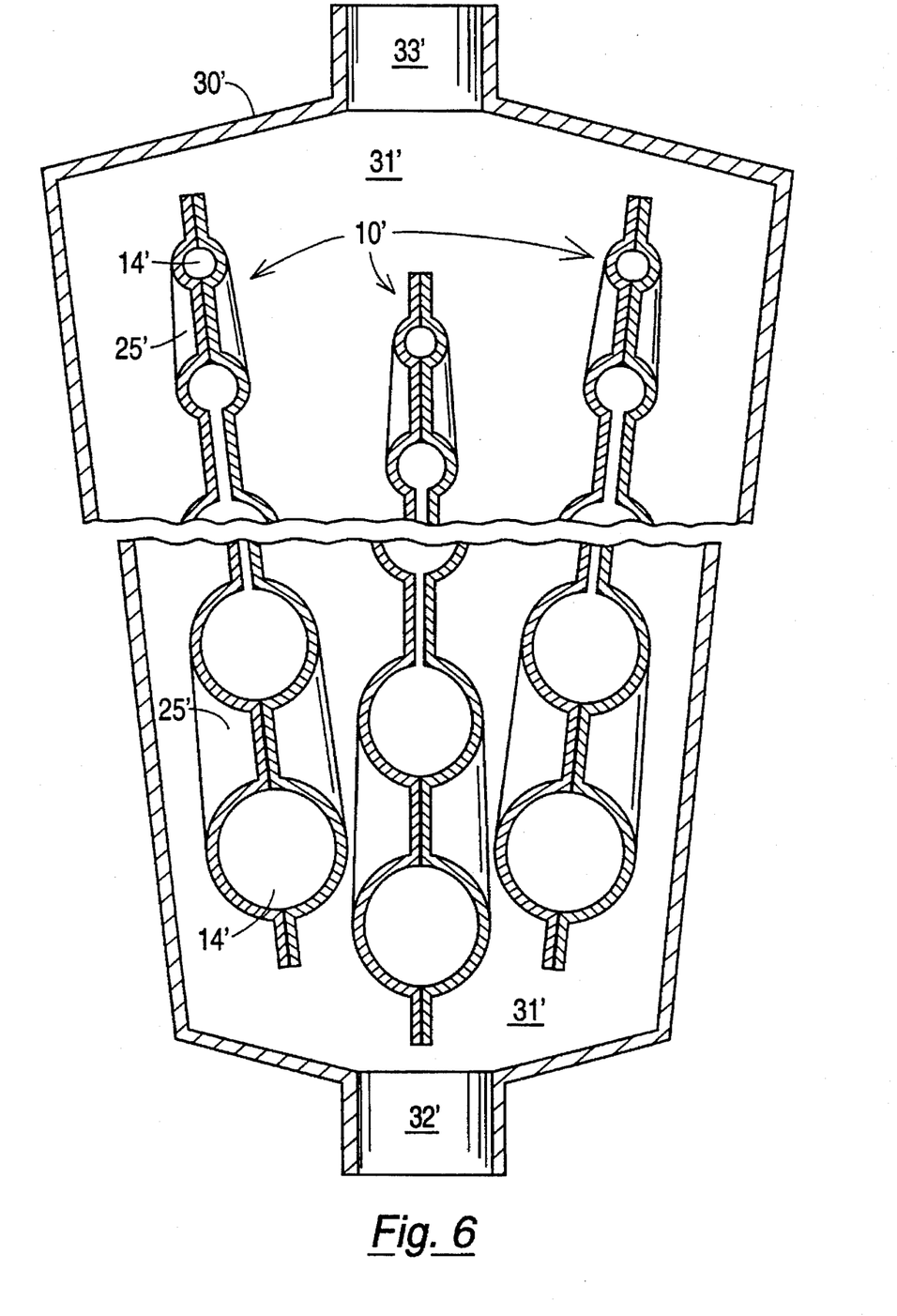
FIG. 6 is a view similar to FIG. 5 (except that everything is in vertical section) of a plurality of apparatuses as in FIGS. 1–4 modified for improved effectiveness and arranged in the enclosure for mass transfer of fluid flowing in the regions around the apparatuses in addition to mass transfer of fluid flowing in each individual apparatus.

FIG. 6 shows an improved arrangement of apparatuses 10', and an improved shape of the surrounding enclosure 30' (as compared to the arrangement and shape in FIG. 5) where mass transfer is to be provided with the fluid 31'. The improved arrangement provides narrow spaces for flow of vapor between the apparatuses 10' in the vicinity of the lower end, where the least vapor is present. The spacing between the apparatuses 10' increases gradually with height in the surrounding enclosure 30' and is widest at the higher end, where the most vapor is present.

In the arrangement shown in FIG. 6, each individual apparatus 10' is operated exothermally (giving off heat) internally as an absorber or condenser; while operation on the outer surfaces of, and in the space between, the apparatuses 10' inside the outer enclosure 30' is endothermic (receiving heat) as a desorber or evaporator.

In an arrangement as in FIG. 6 turned upside down, each individual apparatus 10' is operated endothermally (receiving heat) internally as a debsorber or evaporator; while operation on the outer surfaces of, and in the space between, the apparatuses 10' inside the outer enclosure 30' is exothermic (giving off heat) as an absorber or condenser.

The arrangements of apparatuses as in FIG. 6, and in FIG. 6 upside down, are advantageous in providing transfer of heat directly from the exothermic component (e.g., absorber or condenser) to the endothermic component (e.g., desorber or evaporator).

Each apparatus 10' in FIG. 6 is an improvement of the apparatus 10 as shown in FIGS. 1–4. The improvement comprises the gradual variation in size of the passages 14', 25' from top to bottom, such that the passages are smaller where less vapor is present and larger where more vapor is present. Typically the area of internal surface available for contact with vapor in the passages 14', 25' throughout the apparatus 10' is approximately proportional to the amount of vapor normally present at any given location therein.

In the apparatuses 10,10' the flow of liquid is predominantly downward, and the flow of vapor is predominately upward. The vertical flow of liquid is predominately in the smaller passages 15, while the flow of vapor is predominately in the larger passages 14,25; 14',25'.

Manufacturing costs can be reduced by providing the passages 14,15,25 simply as spaces between a checkerboard-like arrangement of tack welds of the heat conductive plates 12,13 approximately at the locations 17 in FIGS. 1 and 4.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for fluid-liquid contact of fluid and liquid flowing through passages in the apparatus, comprising an enclosure formed in a pair of substantially vertically positioned highly heat conductive plates sealed together at least substantially around their periphery and formed to have rows of vertically spaced apart substantially horizontal passages communicating with columns of horizontally spaced apart substantially vertical passages in and adjacent to a substantially vertical plane defined by the plates and by substantially flat contiguous areas therein between and around the passages;

the inner surfaces of the passages comprising highly wettable areas to substantially maximize transfer of mass and heat;

each substantially horizontal passage being substantially continuous between the substantially vertical passages with which it communicates;

in the portion of the apparatus spaced sufficiently from its periphery that such arrangement is attainable, the axis of each substantially vertical passage between one substantially horizontal passage and the next lower substantially horizontal passage being substantially coincident with a vertical line substantially in the middle of a substantially flat contiguous area between said next lower substantially horizontal passage and the following still lower horizontal passage, and substantially coincident with a vertical line substantially midway between the axes of the two substantially vertical passages on each side of said substantially flat contiguous area;

in such manner that fluid in the substantially vertical passages divides approximately equally in its vertical flow between each substantially horizontal passage and the next;

a first opening in the upper or lower portion of the apparatus for communication of a first fluid between the enclosure and another entity; said first fluid communicating within the enclosure horizontally via the substantially horizontal passages, and vertically via the substantially vertical passages, as diverted between successive levels in the substantially vertical passages by the substantially flat contiguous areas therebetween, with lower or higher substantially horizontal passages;

a second opening in the opposite portion of the apparatus from the portion the first opening is in, for communication of a second fluid between the enclosure and another entity; said second fluid communicating within the enclosure horizontally via the substantially horizontal passages, and vertically via the substantially vertical passages, as diverted between successive levels in the substantially vertical passages by the substantially flat contiguous areas therebetween, with lower or higher substantially horizontal passages;

a third opening in a portion of the apparatus at or near the second opening for communication of a third fluid between the enclosure and another entity; said third fluid communicating within the enclosure horizontally via the substantially horizontal passages, and optionally vertically via the substantially vertical passages, as diverted between successive levels in the substantially vertical passages by the substantially flat contiguous areas therebetween, with lower or higher substantially horizontal passages.

2. Apparatus as in claim 1, wherein the highly heat conductive plates comprise sheet metal plates or plates comprising conductive ceramic or polymeric material.

3. Apparatus as in claim 1, wherein the passages guide the fluids to flow at least predominantly in generally opposite directions therein.

4. Apparatus as in claim 1, wherein the passages guide the fluids to flow at least predominantly in generally similar directions therein.

5. Apparatus as in claim 1, wherein the highest row of substantially vertical passages comprises a plurality of spaced apart substantially vertical passages arranged with a said substantially flat contiguous area between each said passage and the next said passage, the next to highest row of substantially vertical passages comprises a similar plurality of passages and substantially flat contiguous areas, similarly arranged, and staggered relative to the highest row, with each passage located substantially directly below a substantially flat contiguous area in the highest row and with each substantially flat contiguous area located substantially directly below a passage in the highest row, the next lower row of substantially vertical passages comprises a similar plurality of passages and substantially flat contiguous areas, similarly arranged and similarly staggered relative to the next to highest row, and thus similar to the highest row in arrangement and horizontal positions, and so on, with successively lower rows of passages and substantially flat contiguous areas alternately and similarly arranged and staggered.

6. Apparatus as in claim 1, wherein the highly wettable areas of the inner surfaces of the passages comprise regions of the surfaces that have been treated by oxidation, deposition of a rough or porous layer, scratching, etching, embossing, or the like, to increase their roughness and their area of contact with the fluid therein.

7. Apparatus as in claim 6, wherein the outer surfaces of the passages and the other outer surfaces of the enclosure also comprise highly wettable areas that have been substantially equivalently treated to substantially maximize transfer of mass and heat.

8. Apparatus as in claim 1, wherein the highly heat conductive plates are formed additionally to have a predominantly vertical end passage communicating between an end of the highest substantially horizontal passage and the near end of the next lower substantially horizontal passage, a predominantly vertical end passage communicating between the opposite end of said next lower substantially horizontal passage and the near end of the next still lower substantially horizontal passage, a predominantly vertical end passage communicating between the opposite end of said still lower substantially horizontal passage and the near end of the next yet lower substantially horizontal passage, and so on similarly to provide a serpentine path for at least one of the fluids therein including a predominantly vertical end passage communicating between near ends of the next to lowest substantially horizontal passage and the lowest substantially horizontal passage.

9. Apparatus as in claim 1, for absorption of gas by a liquid flowing in generally opposite directions through the passages in the apparatus, wherein the first opening is located in the highest substantially horizontal passage and communicates with an entity that supplies a weak solution into the enclosure, to flow horizontally in said passage and to flow downward therefrom via the substantially vertical passages, as diverted between successive levels in the substantially vertical passages by the substantially flat contiguous areas therebetween, into the lowest substantially horizontal passage;

the third opening is located in a substantially horizontal passage in the lower part of the apparatus and communicates with an entity that supplies a gas into the enclosure to flow horizontally in said passage and to flow predominantly upward therefrom via the substantially vertical passages, as diverted between successive levels in the substantially vertical passages by the substantially flat contiguous areas therebetween, for absorption into the solution, to increase the concentration of gas in the solution; and the second opening is located in the lowest substantially horizontal passage and communicates with an entity that receives from the enclosure the stronger solution that is provided therein by the absorption of the gas into the solution.

10. Apparatus as in claim 8, for absorption of gas by a liquid flowing in generally opposite directions through the passages in the apparatus, wherein the first opening is located in the highest substantially horizontal passage and communicates with an entity that supplies a weak solution into the enclosure, to flow horizontally in said passage and to flow downward therefrom via the substantially vertical passages, as diverted between successive levels in the substantially vertical passages by the substantially flat contiguous areas therebetween, and via the predominantly vertical end passages communicating between the near ends of successive substantially horizonal passages, into the lowest substantially horizontal passage;

the third opening is located in a substantially horizontal passage in the lower part of the apparatus and communicates with an entity that supplies a gas into the enclosure to flow horizontally in said passage and to flow predominantly upward therefrom via the predominantly vertical end passages communicating between the near ends of successive substantially horizontal passages, for absorption into the solution, to increase the concentration of gas in the solution; and the second opening is located in the lowest substantially horizontal passage and communicates with an entity that receives from the enclosure the stronger solution that is provided therein by the absorption of the gas into the solution.

11. Apparatus as in claim 1, for desorption of gas from a liquid flowing through the passages in the apparatus, wherein the second opening is located in the highest substantially horizontal passage and communicates with an entity that supplies a strong solution into the enclosure, to flow horizontally in said passage and to flow downward therefrom via the substantially vertical passages, as diverted between successive levels in the substantially vertical passages by the substantially flat contiguous areas therebetween, into the lowest substantially horizontal passage;

the third opening is located in the upper part of the apparatus and communicates with an entity that receives from the enclosure gas that has been desorbed from the solution; and the first opening is located in the lowest substantially horizontal passage and communicates with an entity that receives from the enclosure the weaker solution that is provided therein by the desorption of gas from the solution.

12. Apparatus as in claim 8, for desorption of gas from a liquid flowing through the passages in the apparatus, wherein the second opening is located in the highest substantially horizontal passage and communicates with an entity that supplies a strong solution into the enclosure, to flow horizontally in said passage and to flow downward therefrom predominantly via the substantially vertical passages, as diverted between successive levels in the substantially vertical end passages by the substantially flat contiguous areas therebetween, and via the predominantly vertical passages communicating between the near ends of successive substantially horizontal passages, into the lowest substantially horizontal passage;

the third opening is located in the upper part of the apparatus and communicates with an entity that receives from the enclosure gas that has been desorbed from the solution predominantly in the substantially horizontal passages and in the predominantly vertical end passages communicating between the near ends of the successive substantially horizontal passages; and the first opening is located in the lowest substantially horizontal passage and communicates with an entity that receives from the enclosure the weaker solution that is provided therein by the desorption of gas from the solution.

13. In a heat transfer system for heating, cooling, or each selectively: apparatus as in claim 1 so connected in the system as to serve, either always or selectively, as at least part of a condenser, an absorber, a generator, an evaporator, or a recuperator.

14. In a heat transfer system for heating, cooling, or each selectively: apparatus as in claim 8 so connected in the system as to serve, either always or selectively, as at least part of a condenser, an absorber, a generator, an evaporator, or a recuperator.

15. A plurality of apparatuses as in claim 1, arranged in substantially vertical and parallel planes spaced apart in a surrounding enclosure for receiving fluid under pressure and at a temperature different from the temperatures in said apparatuses, through an inlet opening in the surrounding enclosure, to flow through the enclosure between and around said apparatuses and exit from an outlet opening spaced apart from the inlet opening in the enclosure; and thereby to transfer heat between said apparatuses and the fluid.

16. A plurality of apparatuses as in claim 1, arranged in substantially vertical and parallel planes spaced apart in a surrounding enclosure for receiving a fluid coolant under pressure and at a temperature below the temperatures in said apparatuses, through a lower inlet opening in the surrounding enclosure, to rise through the enclosure and exit from an upper outlet opening therein; thereby to transfer heat away from said apparatuses and into the coolant.

17. A plurality of apparatuses as in claim 1, arranged in substantially vertical and parallel planes spaced apart in a surrounding enclosure for receiving a fluid heating medium under pressure and at a temperature above the temperatures in said apparatuses, through an upper inlet opening in the surrounding enclosure, to descend through the enclosure and exit from a lower outlet therein; thereby to transfer heat into said apparatuses and away from the fluid heating medium.

18. A combination as in claim 15, wherein the apparatuses either are operated internally in an exothermic capacity and are operated externally in an endothermic capacity, or are operated internally in an endothermic capacity and are operated externally in an exothermic capacity, to provide transfer of heat directly from the exothermic process to the endothermic process.

19. A combination as in claim 15, wherein the outer surfaces of the apparatuses comprise highly wettable areas that have been treated by oxidation, deposition of a rough or porous layer, scratching, etching, embossing, or the like, to increase their roughness and their area of contact with the fluid flowing between the inlet and outlet openings to provide transfer of mass as well as of heat with the fluid; and wherein the apparatuses either are operated internally as absorbers or condensers, and are operated externally on their outer surfaces and in the space between their outer surfaces and the surrounding enclosure as desorbers or evaporators, or wherein the apparatuses are operated internally as desorbers or evaporators, and are operated externally on their outer surfaces and in the space between their outer surfaces and the surrounding enclosure as absorbers or condensers; and thus to provide transfer of heat directly from the exothermic process to the endothermic process.

20. A combination as in claim 19, wherein the surrounding enclosure is shaped, and the apparatuses are positioned, to provide narrow spaces for flow of vapor between the apparatuses in the vicinity of a first end where the least vapor is present and gradually increasing spacing between the apparatuses with increasing distance away from the first end toward an opposite second end where the most vapor is present.

21. Apparatus as in claim 1, wherein the sizes of the passages are smaller where less vapor is present and become gradually larger where more vapor is present, such that the area of internal surface available for contact with vapor in the passages at any given location in the apparatus is approximately proportional to the amount of vapor normally present thereat.

* * * * *